United States Patent [19]

Horiguchi et al.

[11] 4,349,835
[45] Sep. 14, 1982

[54] COLOR PRINTING PROCESS SIMULATOR

[75] Inventors: Satoru Horiguchi, Saitama; Takeshi Sasaoka; Koichi Shimane, both of Kawasaki, all of Japan

[73] Assignees: Dai Nippon Printing Co., Ltd.; Ikegami Tsushinki Co., Ltd., both of Tokyo, Japan

[21] Appl. No.: 237,904

[22] Filed: Feb. 25, 1981

[30] Foreign Application Priority Data

Mar. 4, 1980 [JP] Japan ................................. 55-27150

[51] Int. Cl.³ ............................................. H04N 9/02
[52] U.S. Cl. ........................................ 358/76; 353/80
[58] Field of Search .................................... 358/75, 80

[56] References Cited

U.S. PATENT DOCUMENTS 3,972,066 7/1976 Seki et al. ............................ 358/76

Primary Examiner—John C. Martin
Attorney, Agent, or Firm—Spencer & Kaye

[57] ABSTRACT

In a color reproduction method for reproducing a color image on a color monitor screen by processing primary color signals of cyan, magenta, yellow and black which are derived by scanning color separation films of cyan, magenta, yellow and black, respectively, on the basis of the Neugebauer equations, at first the primary color signals of cyan, magenta and yellow are processed in accordance with specially derived color reproduction equations representing halftone of three additive primary colors of red, green and blue to produce three secondary color signals and a tertiary color signal, and then amplitudes of a paper color signal, the primary color signals, the secondary color signals, the tertiary color signal and the primary color signal of black are adjusted in this order independently from each other. An apparatus for carrying out the above color reproduction method comprises seven multipliers, four inverters and twenty seven variable resistors and by suitably adjusting the variable resistors the colors of the image displayed on the color monitor can be controlled.

10 Claims, 2 Drawing Figures

COLOR PRINTING PROCESS SIMULATOR

BACKGROUND OF THE INVENTION

The present invention generally relates to a color printing technique, and more particularly a color simulating technique for calibrating, controlling and estimating a color print image with the aid of a color image displayed on a screen of a color monitor. In such a color printing simulation at first a set of primary color signals of cyan, magenta, yellow and black are derived by scanning a set of color separation films of cyan, magenta, yellow and black by means of a cathode ray tube scanner or a color television camera. Next the primary color signals are processed in accordance with given equations to produce three additive primary color signals of red, green and blue, and then the primary color signals thus produced are supplied to a color monitor so as to display a color image on its screen.

While inspecting the color image displayed on the monitor screen, accurate perception of color reproduction quality, preproof study of color images, inspection of color balance, etc. can be effected and the simulation of color printing process can be carried out.

There have been developed several methods for reproducing color and among them a color reproducing method on the basis of Neugebauer equations relating to the color reproducibility for halftone is most accurate and practical. The color reproducing method based on the Neugebauer theory can be realized in various ways in accordance with methods of expressing theoretical equations and manners for processing signals. For instance, in a method described in Japanese Patent application Publication Nos. 4,777/76 and 5,305/76, four color separation films of cyan, magenta, yellow and black are scanned by a cathode ray tube scanner to derive color image signals and then these color image signals are processed to produce four primary color signals of cyan, magenta, yellow and black, three secondary color signals of red, green and blue, a tertiary color signal and a signal for representing color of papers to be used. These nine signals are then multiplied by suitable coefficients which differ for inks and papers to be used and other elements as well as for three stimulative values of a color video image reproduced on a monitor screen. Finally these signals are totally summed up for respective stimulative values. In this method in order to produce the above mentioned nine signals there must be provided eight logarithmic conversion circuits, nine summing circuits and nine exponential amplifiers or twenty four multiplying circuits. As compared with the summing circuit, the multiplying circuit is much more complicated and is liable to generate error and thus, it is preferable to reduce the number of the multiplying circuits. It should be further noted that in the known methods since the number of elements to be adjusted is large, it is rather difficult to correct or adjust the colors of the displayed image in a simple and accurate manner.

SUMMARY OF THE INVENTION

The present invention has for its object to provide a novel and useful method for reproducing a color image displayed on a color monitor screen, in which the color reproduction of the color image can be corrected or adjusted in a simple, positive and accurate manner.

The inventors of the present invention have recognized the fact that the above object can be attained by constructing a color reproducing circuit on a basis of equations representing red, green and blue colors of additive mixture principle with adopting the Neugebauer equations and by modifying the equations in such a manner that the circuit construction becomes simpler in a practical view point.

According to the invention a method for reproducing a color image on a screen of a color monitor for simulating a color printing process comprises a step of processing primary color signals, which are obtained by scanning a set of color separation films formed from a color original to be simulated, on the basis of color reproduction equations of halftone representing three additive primary colors to derive secondary color signals and a tertiary color signal; and a step of adjusting amplitudes of a signal expressing paper color, the primary color signals, the secondary color signals, the tertiary color signal and the primary color signal of black in this order independently from each other.

The present invention also relates to an apparatus for reproducing a color image on a screen of a color monitor for simulating a color printing process and has an object to provide a novel and useful color reproducing apparatus which can be constructed simply with the minimum number of multipliers and by means of which colors of the reproduced image can be easily, positively and accurately adjusted.

According to the invention an apparatus for reproducing a color image for simulating a color printing process comprises means for effecting a gamma correction of ink with respect to primary color signals C, M and Y and a black signal BL which are derived by scanning four color separation films of cyan, magenta, yellow and black, respectively to produce corrected primary color signals c, m and y and a corrected black signal bl;

means for receiving the corrected primary color signals c, m and y and generating secondary color signals cm, cy and my and a tertiary color signal cmy;

means for adjusting amplitudes of the primary, secondary and tertiary color signals independently from each other;

means for summing the adjusted primary color signals c, m and y, the secondary color signals cm, cy and my and the tertiary color signal cmy on a basis of color reproduction equations of halftone expressing three additive primary colors to produce output signals $c''$, $m''$ and $y''$;

means for receiving said output signals $c''$, $m''$ and $y''$ from the summing means and the gamma corrected black signal bl and for subtracting each of these signals $c''$, $m''$, $y''$ and bl from a unity to produce output signals $(1-c'')$, $(1-m'')$, $(1-y'')$ and $(1-bl)$;

first black adding means for receiving said output signals $(1-c'')$, $(1-m'')$, $(1-y'')$ and $(1-bl)$ from the subtracting means and for multiplying the signals $(1-c'')$, $(1-m'')$ and $(1-y'')$ by $(1-bl)$, respectively to produce output product signals $(1-bl).(1-c'')$, $(1-bl).(1-m'')$ and $(1-bl).(1-y'')$;

second black adding means for receiving said output product signals $(1-bl).(1-c'')$, $(1-bl).(1-m'')$ and $(1-bl).(1-y'')$ from the first black adding means and the corrected black signal bl and for adding the corrected black signal to the output product signals $(1\text{-}bl)\cdot(1\text{-}c'')$, $(1\text{-}bl)\cdot(1\text{-}m'')$ and $(1\text{-}bl)\cdot(1\text{-}y'')$, respectively to produce output signals of red, green and blue colors R, G and B;

means for receiving said signals of red, green and blue colors R, G and B and for correcting these signals with respect to paper color to produce paper color corrected color signals;

means for receiving the paper color corrected color signals R', G' and B' and for correcting monitor gamma to produce monitor gamma corrected color signals; and means for supplying the monitor gamma corrected signals R'', G'' and B'' to the color monitor.

DESCRIPTION OF THE PREFERRED EMBODIMENTS

Figure 1:
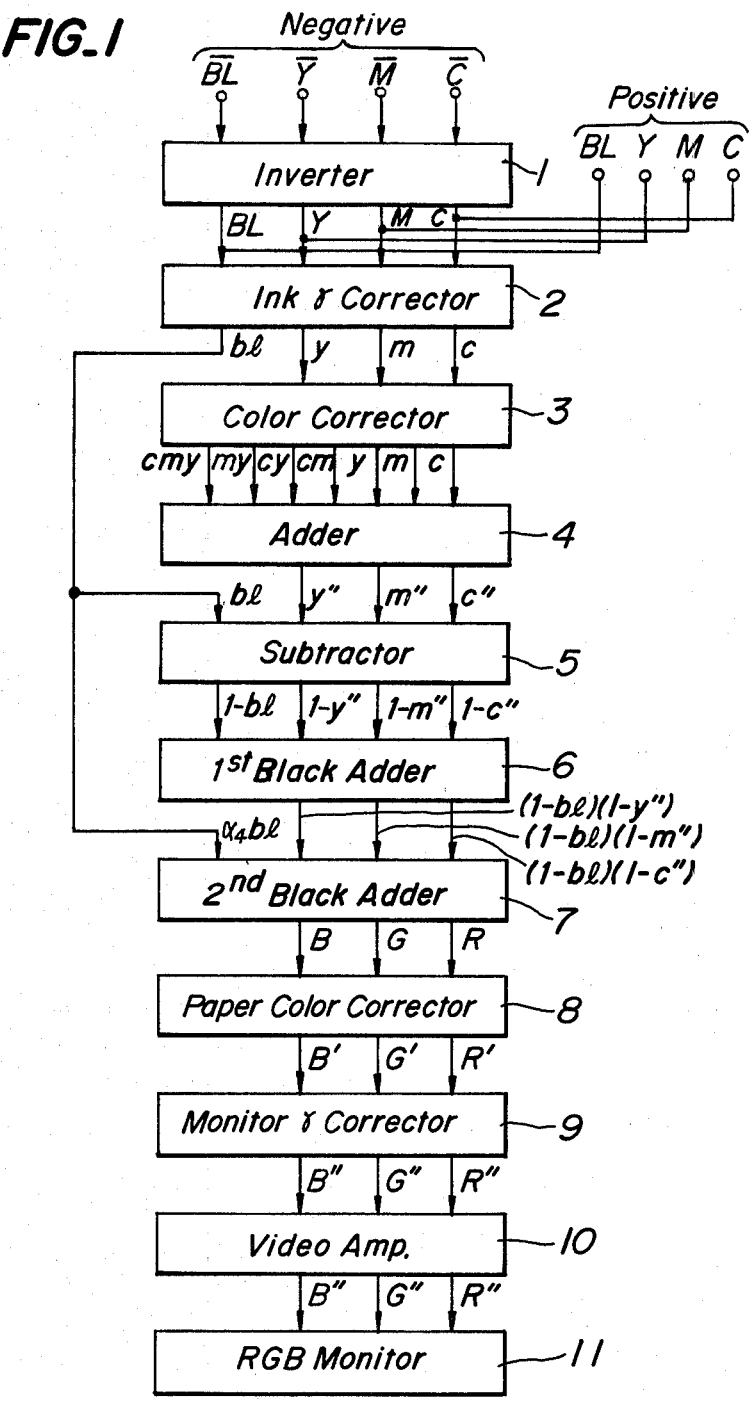
FIG. 1 is a block diagram showing an embodiment of a color reproducing apparatus according to the invention.

The principle of the color reproducing method according to the invention will be first explained theoretically. Now it is assumed that c, m, y and bl are percentages of halftone dot areas obtained from halftone type color separation films of cyan, magenta, yellow and black, respectively; Rc, Rm, Ry and Rbl are reflectances, measured with red light, of cyan, magenta, yellow and black inks, respectively as denoted by suffixes c, m, y and bl; and Rcm, Rmy, Rcy, Rcbl, Rmbl, Rybl, Rcmy, Rmybl, Rcybl and Rcmybl are reflectances, measured with red light, of combinations of cyan, magenta, yellow and black inks as denoted by suffixes. For instance, Rmy is a reflectance, measured with red light, of magenta ink printed over yellow ink. Then a total reflectance for the red light can be expressed by the following equation.

$$R = (1\text{-}c)(1\text{-}m)(1\text{-}y)(1\text{-}bl) + c(1\text{-}m)(1\text{-}y)(1\text{-}bl)Rc \quad (1)$$
$$+ m(1\text{-}c)(1\text{-}y)(1\text{-}bl)Rm + y(1\text{-}c)(1\text{-}m)(1\text{-}bl)Ry$$
$$+ bl(1\text{-}c)(1\text{-}m)(1\text{-}y)Rbl + my(1\text{-}c)(1\text{-}bl)Rmy$$
$$+ cy(1\text{-}m)(1\text{-}bl)Rcy + cm(1\text{-}y)(1\text{-}bl)Rcm$$
$$+ mbl(1\text{-}c)(1\text{-}y)Rmbl + cbl(1\text{-}m)(1\text{-}y)Rcbl$$
$$+ ybl(1\text{-}c)(1\text{-}m)Rybl + cmy(1\text{-}bl)Rcmy$$
$$+ mybl(1\text{-}c)Rmybl + cmbl(1\text{-}y)Rcmbl$$
$$+ cybl(1\text{-}m)Rcybl + cmybl \cdot Rcmybl$$

In the above equation (1) each of the reflectances Rcbl, Rmbl, Rybl, Rcmbl, Rmybl, Rcybl and Rcmybl may be assumed to be equal to the reflectance Rbl of the black ink and the above equation can be simplified in the following equation (2).

$$R = (1\text{-}bl)\{1\text{-}(\alpha_1 \cdot c + \alpha_2 \cdot m + \alpha_3 \cdot y - \alpha_5 \cdot cm - \quad (2)$$
$$\alpha_6 \cdot cy - \alpha_7 \cdot my - \alpha_8 \cdot cmy)\} + \alpha_4 \cdot bl$$
$$\equiv (1\text{-}bl)(1\text{-}c'') + \alpha_4 \cdot bl \quad (2')$$

Wherein,

-continued $\alpha_1 = 1 - Rc$, $\alpha_2 = 1 - Rm$, $\alpha_3 = 1 - Ry$, $\alpha_4 = Rbl$, $\alpha_5 = 1 - Rc - Rm + Rcm$, $\alpha_6 = 1 - Rc - Ry + Rcy$, $\alpha_7 = 1 - Rm - Ry + Rmy$, $\alpha_8 = 1 - Rc - Rm - Ry + Rcm + Rcy + Rmy$ In order to simulate color of paper, the above equation (2) is modified in the following equation (3) by multiplying $\alpha_0$.

$$R' = (1\text{-}bl)\{\alpha_0 - (\alpha'_1 \cdot c + \alpha'_2 \cdot m + \alpha'_3 \cdot y - \quad (3)$$
$$\alpha'_5 \cdot cm - \alpha'_6 \cdot cy - \alpha'_7 my - \alpha'_8 \cdot cmy)\} + \alpha'_4 \cdot bl$$
$$\equiv (1\text{-}bl)(\alpha_0 - c'''_1) + \alpha'_4 \cdot bl \quad (3')$$

Wherein, $\alpha_1' = \alpha_0\alpha_1$, $\alpha_2' = \alpha_0\alpha_2$, $\alpha_3' = \alpha_0\alpha_3$, $\alpha_4' = \alpha_0\alpha_4$, $\alpha_5' = \alpha_0\alpha_5$, $\alpha_6' = \alpha_0\alpha_6$, $\alpha_7' = \alpha_0\alpha_7$, $\alpha_8' = \alpha_0\alpha_8$ In the similar manner the following equations may be derived for green G and Blue B colors.

$$G = f(\beta) \quad (4)$$
$$B = f(\gamma) \quad (5)$$

In the above equation (3), $\alpha_0$ in a term within round brackets represents the color of paper and $\alpha_1'\cdot c$, $\alpha_2'\cdot m$ and $\alpha_3'\cdot y$ represent primary cyan, magenta and yellow colors, respectively, $\alpha_5'\cdot cm$, $\alpha_6'\cdot cy$ and $\alpha_7'\cdot my$ denote secondary blue, green and red colors, respectively, $\alpha_8'\cdot cmy$ expresses a tertiary color of black, and $\alpha_4'\cdot bl$ represents black. To the equations (4) and (5) expressing the remaining green and blue colors the same may be applied. Therefore, by suitably adjusting the following coefficients for the respective color signals, it is possible to simulate or correct respective colors independently from each other.

| | |
|---|---|
| paper color | $(\alpha_0, \beta_0, \gamma_0)$ |
| primary colors | $(\alpha'_1, \alpha'_2, \alpha'_3, \beta'_1, \beta'_2, \beta'_3,$ $\gamma'_1, \gamma'_2, \gamma'_3)$ |
| Secondary colors | $(\alpha'_5, \alpha'_6, \alpha'_7, \beta'_5, \beta'_6, \beta'_7,$ $\gamma'_5, \gamma'_6, \gamma'_7)$ |
| Tertiary color | $(\alpha'_8, \beta'_8, \gamma'_8)$ |
| Black | $(\alpha'_4, \beta'_4, \gamma'_4)$ |

When an electric circuit is to be composed on the basis of the above equations, cm, cy, my of secondary colors and cmy of tertiary color in the equation (2) are derived by means of multiplying circuits and then c'' in the equation (2') is derived by a summing circuit after adjustments for the coefficients $\alpha_1$ to $\alpha_3$ have been effected. Next a calculation of (1-c'') is carried out by an inverter and then (1-c'') is multiplied by (1-bl) in a multiplying circuit.

Then the product of $(1\text{-}c'')\cdot(1\text{-}bl)$ is added to $\alpha_4\cdot bl$ in a summing circuit and finally the whole is multiplied by $\alpha_0$ in an adjuster so as to obtain the primary color signal of red. For green and blue colors similar circuits may be provided, but the circuits for producing the secondary colors cm, cy and my and the tertiary color cmy may be common for red, green and blue. Therefore, the number of necessary multipliers is seven, i.e. four for producing the secondary and tertiary colors and three for effecting multiplication with (1-bl) for respective red, green and blue color signals.

Now the present invention will be explained in detail with reference to a preferred embodiment.

Figure 2:
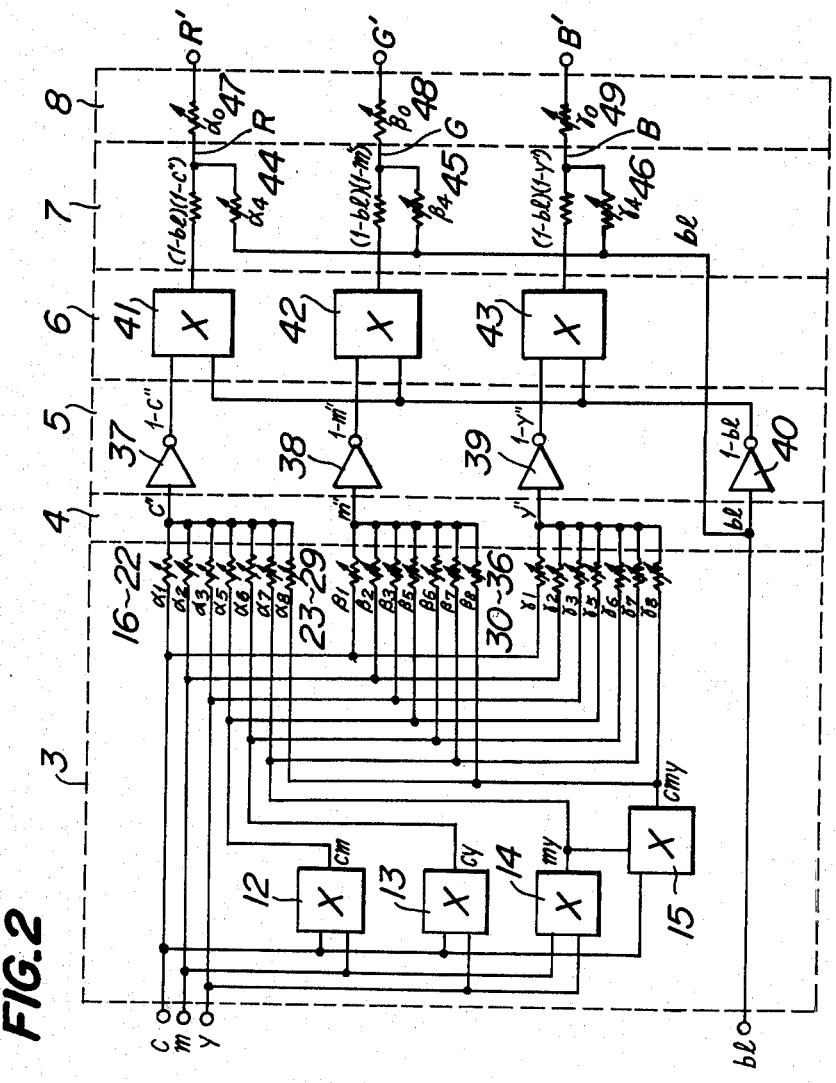
FIG. 2 is a circuit diagram illustrating an embodiment of color correcting and adjusting circuits of the apparatus shown in FIG. 1.

FIG. 1 is a block diagram showing an embodiment of an apparatus for carrying out the color reproduction method according to the invention. At first, halftone type color separation negatives of cyan, magenta, yellow and black formed from a color original are scanned by a cathode ray tube scanner or a color television camera to derive color dot signals C, M, Y and BL of respective colors. These signals are supplied to an inverter 1 and are converted into color dot signals C, M, Y and BL of positives. In order to satisfy the Neugebauer equations for color reproduction it is necessary to consider additivity and proportionality of densities described in chapter 8 of "PRINCIPLES OF COLOR REPRODUCTION" written by J. H. Yule. In color printing a linear proportionality is lost in accordance with increase in dot areas mainly due to blur of inks. The color dot signals C, M, Y and BL are supplied to an ink gamma correction circuit 2 so as to compensate the undesired linear proportionality. Then, mathematical operations by means of signal process circuits can be effected satisfactorily. Output signals from the ink gamma correction circuit 2 are denoted by c, m, y and bl. These signals c, m, y and bl are then supplied to a color corrector 3 which comprises four multipliers 12 to 15 as shown in FIG. 2 and produces secondary color signals cm, cy and my and a tertiary color signal cmy. The color corrector 3 further comprises three sets of variable resistors 16 to 22; 23 to 29; and 30 to 36; by means of which amplitudes of the color signals c, m, y, cm, cy, ym and cmy are adjusted to control or correct the coefficients $\alpha_1 \sim \alpha_3$, $\alpha_5 \sim \alpha_8$; $\beta_1 \sim \beta_3$, $\beta_5 \sim \beta_8$; and $\gamma_1 \sim \gamma_3$, $\gamma_5 \sim \gamma_8$; respectively. These coefficients are all smaller than unity. Output signals from the respective sets of variable resistors are summed up in a summing circuit 4 to produce signals c'', m'' and y''. By adjusting the variable resistors it is also possible to correct any decrease in tone at transients from the secondary color of high density to the tertiary color. The output signals c'', m'' and y'' from the summing circuit 4 as well as the black signal bl from the circuit 2 are supplied to a subtracting circuit 5 which comprises inverters 37 to 40 for producing inverted output signals (1-c''), (1-m''), (1-y'') and (1-bl). These signals are then supplied to a first black adder 6 which comprises three multipliers 41, 42 and 43 for generating output product signals (1-bl).(1-c''); (1-bl).(1-m''); and (1-bl).(1-y''). That is to say output signal (1-bl) from the inverter 40 is supplied parallelly to the multipliers 41, 42 and 43 at one inputs thereof and the output signals (1-c''), (1-m'') and (1-y'') from the inverters 37, 38 and 39 are supplied to other inputs of the multipliers 41, 42 and 43, respectively. The output product signals (1-bl).(1-c''); (1-bl).(1-m''); and (1-bl).(1-y'') are supplied to a second black adder 7 comprising variable resistors 44, 45 and 46 through which the black signal bl is passed. Then, the signals $\alpha_4$.bl and $\gamma_4$.bl are added to the product signals (c-bl).(1-c''), (1-bl).(1-m'') and (1-bl).(1-y''), respectively. By adjusting the variable resistors 44, 45 and 46, the coefficients $\alpha_4$, $\beta_4$ and $\gamma_4$ can be properly adjusted so as to regulate the amounts of black ink to be added to desired values. In this manner from the second black adder 7 the primary color signals R, G and B can be obtained. These signals are then further supplied to a paper color corrector 8 comprising variable resistors 47, 48 and 49 for adjusting the coefficients $\alpha_0$, $\beta_0$ and $\gamma_0$, respectively. By suitably adjusting the variable resistors 47, 48 and 49, the red, green and blue color signals can be adapted to the paper color. The corrected signals R', G' and B' from the paper color corrector 8 is further supplied to a monitor gamma corrector 9. In general, a cathode ray tube of a monitor has a gamma of 2.2 and this gamma should be corrected to unity. For this purpose the color signals R', G' and B' have to be reversely converted by passing them through non-linear circuits having gamma of 0.45. Output signals R'', G'' and B'' from the monitor gamma corrector 9 are then supplied through a video amplifier 10 to a color monitor 11 on which a desired color image can be displayed.

In case of effecting color matching and color correction use may be made of standard color patches which have been printed by means of the standard color separation films. That is to say, on the monitor screen the color image of the original and the images of the color patches are simultaneously displayed. At first, course adjustment is effected in such a manner that the displayed color patch image becomes similar to the standard color patches which is placed beside the four color separation films. Next, while inspecting halftone of the displayed color image, a fine adjustment is carried out. This adjustment is effected in the following order.

| | | |
|---|---|---|
| (1) | color of paper | ($\alpha_0$, $\beta_0$, $\gamma_0$) |
| (2) | primary color | ($\alpha_1$, $\alpha_2$, $\alpha_3$, $\beta_1$, $\beta_2$, $\beta_3$, $\gamma_1$, $\gamma_2$, $\gamma_3$) |
| (3) | secondary color | ($\alpha_5$, $\alpha_6$, $\alpha_7$, $\beta_5$, $\beta_6$, $\beta_7$, $\gamma_5$, $\gamma_6$, $\gamma_7$) |
| (4) | tertiary color | ($\alpha_8$, $\beta_8$, $\gamma_8$) |
| (5) | black color | ($\alpha_4$, $\beta_4$, $\gamma_4$) |

As explained above, since the color reproducing apparatus according to the present invention comprises only seven multipliers; i.e. four in the color corrector 3 and three in the first black adder 6, the apparatus can be constructed in a simple and economic manner and the accurate and reliable color reproduction can be carried out. Moreover since the number of elements to be adjusted is small, the adjustment of color can be effected in a very simple and stable manner. Further the influence due to lack of linear proportionality and the non-linearity of the cathode ray tube of the color monitor can be corrected and the color of paper, the primary, secondary, tertiary and black colors can be corrected or adjusted independently from each other. In this manner the color printing process can be easily and precisely simulated with the aid of the color image displayed on the color monitor.

What is claimed is:

1. A method for reproducing a color image on a screen of a color monitor for simulating a color printing process comprising a step of processing primary color signals, which are obtained by scanning a set of color separation films formed from a color original to be simulated, on the basis of color reproduction equations of halftone representing three additive primary colors to derive secondary color signals and a tertiary color signal; and a step of adjusting amplitudes of a signal expressing paper color, the primary color signals, the secondary color signals, the tertiary color signal and the primary color signal of black in this order independently from each other.

2. A method according to claim 1, wherein said color separation films are cyan, magenta, yellow and black separation films, and said primary color signals are cyan, magenta and yellow color signals.

3. A method according to claim 2, wherein said cyan, magenta, yellow and black separation films are negatives.

4. A method according to claim 2, wherein said cyan, magenta, yellow and black separation films are positives.

5. An apparatus for reproducing a color image on a screen of a color monitor for simulating a color printing process comprising means for effecting a gamma correction of ink with respect to primary color signals C, M and Y and a black signal BL which are derived by scanning four color separation films of cyan, magenta, yellow and black, respectively to produce corrected primary color signals c, m and y and a corrected black signal bl;

means for receiving the corrected primary color signals c, m and y and generating secondary color signals cm, cy and my and a tertiary color signal cmy;

means for adjusting amplitudes of the primary, secondary and tertiary color signals independently from each other;

means for summing the adjusted primary color signals c, m and y, the secondary color signals cm, cy and my and the tertiary color signal cmy on a basis of color reproduction equations of halftone expressing three additive primary colors to produce output signals c'', m'' and y'';

means for receiving said output signals c'', m'' and y'' from the summing means and the gamma corrected black signal bl and for subtracting each of these signals c'', m'', y'' and bl from a unity to produce output signals (1-c''), (1-m''), (1-y'') and (1-bl);

first black adding means for receiving said output signals (1-c''), (1-m''), (1-y'') and (1-bl) from the subtracting means and for multiplying the signals (1-c''), (1-m'') and (1-y'') by (1-bl), respectively to produce output product signals (1-bl).(1-c''), (1-bl).(1-m'') and (1-bl).(1-y'');

second black adding means for receiving said output product signals (1-bl).(1-c''), (1-bl).(1-m'') and (1-bl).(1-y'') from the first black adding means and the corrected black signal bl and for adding the corrected black signal with adjusted amplitude to the output product signals (1-bl).(1-c''), (1-bl).(1-m'') and (1-bl).(1-y''), respectively to produce output signals of red, green and blue colors R, G and B;

means for receiving said signals of red, green and blue colors R, G and B and for correcting these signals with respect to paper color to produce paper color corrected color signals;

means for receiving the paper color corrected color signals R', G' and B' and for correcting monitor gamma to produce monitor gamma corrected color signals; and means for supplying the monitor gamma corrected signals R'', G'' and B'' to the color monitor.

6. An apparatus according to claim 5, wherein said means for generating the secondary and tertiary color signals comprises first, second and third inputs for receiving the primary color signals c, m and y, respectively; and first multiplier having inputs connected to the first and second inputs to produce the secondary color signal cm, a second multiplier having inputs connected to the first and third inputs to produce the secondary color signal cy, a third multiplier having inputs connected to the second and third inputs to produce the secondary color signal ym and a fourth multiplier having a first input connected an output of any one of the first, second and third multipliers and a second input connected to one of the inputs which is not connected to the inputs of the multiplier the output of which is connected to said first input, to produce the tertiary color signal cmy.

7. An apparatus according to claim 5, wherein said means for adjusting the magnitudes of the primary, secondary, and tertiary color signals comprises first, second, third, fourth, fifth, sixth and seventh inputs for receiving the primary color signals c, m, y, the secondary color signals cm, cy and ym, and the tertiary signal cmy, respectively; and first, second and third sets of seven variable resistors having one terminals connected to the first, second, third, fourth, fifth, sixth and seventh inputs, respectively.

8. An apparatus according to claim 5, wherein said first black adding means comprises first, second, third and fourth inputs for receiving the inverted signals (1-c''), (1-m''), (1-y'') and (1-bl);

a first multiplier having inputs connected to the first and fourth inputs to produce the product signal (1-bl).(1-c'');

a second multiplier having inputs connected to the second and fourth inputs to produce the product signal (1-bl).(1-m''); and a third multiplier having inputs connected to the third and fourth inputs to produce the product signal (1-bl).(1-y'').

9. An apparatus according to claim 5, wherein said second black adding means comprises first, second, third and fourth inputs for receiving the product signals (1-bl).(1-c''), (1-bl).(1-m''), (1-bl).(1-y'') and the black signal bl;

first, second and third fixed resistors having one terminals connected to the first, second and third inputs, respectively; and first, second and third variable resistors having one terminals connected commonly to the fourth input and the other terminals connected to other terminals of the respective first, second and third fixed resistors.

10. An apparatus according to claim 5, wherein said means for correcting the color of paper comprises first, second and third inputs for receiving the red, green and blue color signals, respectively; and first second and third variable resistors having one ends connected to the first, second and third inputs, respectively.

* * * * *